United States Patent
Patterson et al.

(10) Patent No.: US 10,133,282 B2
(45) Date of Patent: Nov. 20, 2018

(54) SHUTTLE VALVE WITH DURABLE SOFT SEAL

(71) Applicant: Proserv Operations, Inc., Houston, TX (US)

(72) Inventors: Andy Patterson, Katy, TX (US); Gerardo Martinez, Houston, TX (US)

(73) Assignee: PROSERV OPERATIONS, INC., Houston, TX (US)

( * ) Notice: Subject to any disclaimer, the term of this patent is extended or adjusted under 35 U.S.C. 154(b) by 0 days.

(21) Appl. No.: 15/260,662

(22) Filed: Sep. 9, 2016

(65) Prior Publication Data

US 2017/0075364 A1  Mar. 16, 2017

Related U.S. Application Data

(60) Provisional application No. 62/219,187, filed on Sep. 16, 2015.

(51) Int. Cl.
| | |
|---|---|
| *G05D 16/10* | (2006.01) |
| *E21B 33/064* | (2006.01) |
| *F16K 11/044* | (2006.01) |
| *F16K 11/07* | (2006.01) |
| *F16K 17/04* | (2006.01) |
| *E21B 33/06* | (2006.01) |

(52) U.S. Cl.
CPC ......... *G05D 16/106* (2013.01); *E21B 33/064* (2013.01); *F16K 11/044* (2013.01); *F16K 11/0712* (2013.01); *F16K 17/0473* (2013.01); *E21B 33/061* (2013.01)

(58) Field of Classification Search
CPC .......................... G05D 16/106; F16K 17/0473
USPC ................................................. 137/112, 113
See application file for complete search history.

(56) References Cited

U.S. PATENT DOCUMENTS

| | | | | |
|---|---|---|---|---|
| 2,311,851 A * | 2/1943 | McClure | ............... | F16K 15/025 137/113 |
| 2,799,523 A * | 7/1957 | Parker | .................. | B64D 37/005 277/449 |
| 2,892,644 A * | 6/1959 | Collins | .................... | F16J 15/32 251/324 |
| 3,145,723 A * | 8/1964 | Chorkey | ............... | F16K 17/164 137/112 |
| 4,253,481 A * | 3/1981 | Sarlls, Jr. | ............... | F16K 11/044 137/112 |
| 2010/0154896 A1* | 6/2010 | Thrash, Jr. | ............ | F16K 11/044 137/112 |

* cited by examiner

*Primary Examiner* — Marina Tietjen
*Assistant Examiner* — Paul J Gray
(74) *Attorney, Agent, or Firm* — Patterson + Sheridan, LLP (57) ABSTRACT

A shuttle valve having a cage fixed in the cross bore thereof by opposed inlet adaptors extending into opposed first and second inlets is provided. A shuttle is reciprocally located in a bore in the cage, to selectively seal one of the first or second inlets from fluid communication with the valve outlet. The shuttle may be spring biased to maintain one of the inlets in the closed position without the need to apply a pressure into an inlet of the valve.

10 Claims, 8 Drawing Sheets

SHUTTLE VALVE WITH DURABLE SOFT SEAL

BACKGROUND OF THE INVENTION

Field of the Invention

The present invention relates to the field of valves. More particularly, the invention relates to the field of shuttle valves operable to pass fluid thereinto from one of two inlets, based on the pressure at the inlets, and pass that fluid therethrough to a valve outlet. Such valves provide both primary and backup fluid availability to a device to which they are ported, such as the control logic circuits of a blowout preventer, including a blowout preventer located in a subsea environment.

Description of the Related Art

Systems for closing off the bore of a well being drilled or completed in the event of an overpressure condition in the well bore typically include one or more blowout preventers, at least two or more pressure sources such as accumulators, and one or more control valves arranged between the pressure source and the blowout preventer. The blowout preventer(s) may include hydraulic rams located on opposed sides of the well bore opening, which close and seal off the well bore when an abnormal pressure condition is encountered and there is a risk that the pressure of the hydrocarbon formation pierced by the well bore exceeds the pressure imposed on those fluids by the weight of the drilling mud in the well bore. Additionally, annular blowout preventers, which close off the well opening by inwardly moving an annulus, are also in use and are hydraulically operated using pressure sources and valves. These blowout preventer devices include hydraulically operated control logic circuits. During normal conditions, when the weight of the drilling mud in the well bore is sufficient to maintain pressurized hydrocarbons in place in the well bore, the pressure sources such as pressurized accumulators for the control logic circuits are maintained in a closed, i.e., standby, condition, and they each contain sufficient fluid to operate the logic circuits of a blowout preventer to control the blowout preventer In this state, where a shuttle valve is used as the control valve, the shuttle valve is not pressurized.

A shuttle valve includes a shuttle configured, upon pressurization thereof by the opening of the pressure source, to operate the logic circuits of a blowout preventer, or other device. Shuttle valves are used in these applications to supply redundancy, for safety reasons, of pressurized fluid sources to the control circuits of the blowout preventer. The well operator can choose to open only one of the pressure sources to operate the blowout preventer control circuits. However, to ensure the blowout preventer is closed, by porting two different pressure sources to different inlets of the control shuttle valve, the configuration of the control shuttle valve enables the control shuttle valve to selectively pass only one of these pressure sources therethrough to a control valve used to operate the blowout preventer.

To ensure correct operation of the operating system for the blowout preventer to close the well bore, the operating system, including the control valves including the control valves, is periodically tested to ensure that the blowout preventer closes when the fluid in the pressure sources is released to flow thereto. The shuttle valve includes a physical shuttle therein which is moveable to close off an inlet and open the other inlet to the outlet, so as to allow only one of the pressurized fluid sources to pass therethrough. During testing, this shuttle rapidly moves across a central bore of the shuttle, moving past and inducing wear on seals extending inwardly of the shuttle bore, and also rapidly engages against metal surfaces at the inlet being closed off by the shuttle. This can cause wear and premature failure, and the need to replace, the valve.

SUMMARY OF THE INVENTION

A shuttle valve is provided for selectively providing one of a plurality of fluid sources to a hydraulically operated component located downstream thereof. The valve includes a body having a first bore extending therethrough within which a first and a second inlet are configured, and a flow path selection member interposed therein between the first and the second inlet. An outlet having a bore intersects the first bore, and fluidly communicates with one of the first and second inlets through the flow path selection member. A shuttle is operatively moveable with respect to the flow path selection member and the first and second inlets to selectively close off one of the inlets while opening the other of the inlets to allow flow from the other inlet through the flow path selection member.

In an embodiment, the flow path selection member is a cage which is fixed in position within the first bore, and within which the shuttle may move. The cage includes a cage bore within which the shuttle moves, and it includes a first outlet and a second outlet spaced from the first outlet, both of which communicate with the first bore. The shuttle, based upon the forces acting on opposed sides thereof as supplied by fluid pressure communicated through the first and second inlets of the body, is moveable to block one of the outlets while leaving the other outlet unblocked. Each of the first and second outlets may be configured as a plurality of flow passages. A spring may be provided in one of the first and second inlets to bear against the shuttle, to bias the shuttle to close the other of the inlets when the valve is not pressurized.

In a further aspect, the cage is secured in the first bore by opposed inlet adaptors secured to opposed ends of the body, and abutting against the opposed sides of the cage to secure the cage in position. In a yet further aspect, shuttle disks are provided between the inlet adaptors and the cage. The shuttle and inlet adaptors may be configured of different materials, such that the shuttle may effectively seal against the shuttle disk.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
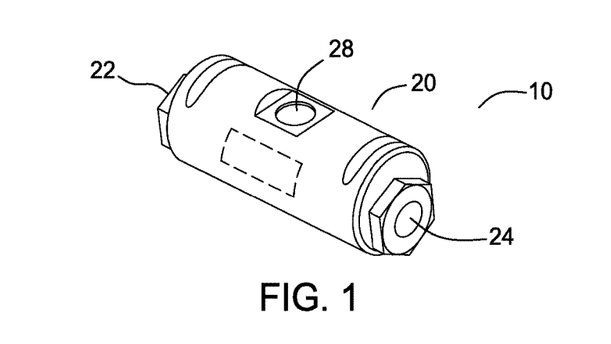
FIG. 1 is a perspective view of a shuttle valve used as a control valve in a control system.
Figure 2:
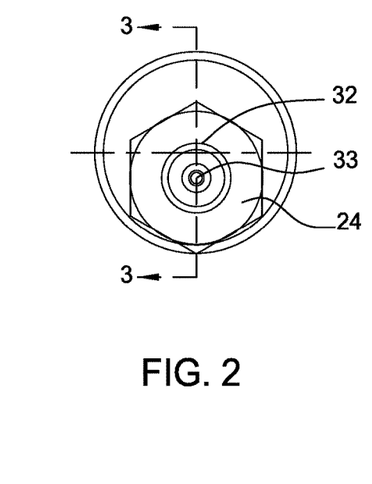
FIG. 2 is an end view of the shuttle valve of FIG. 1.
Figure 3:
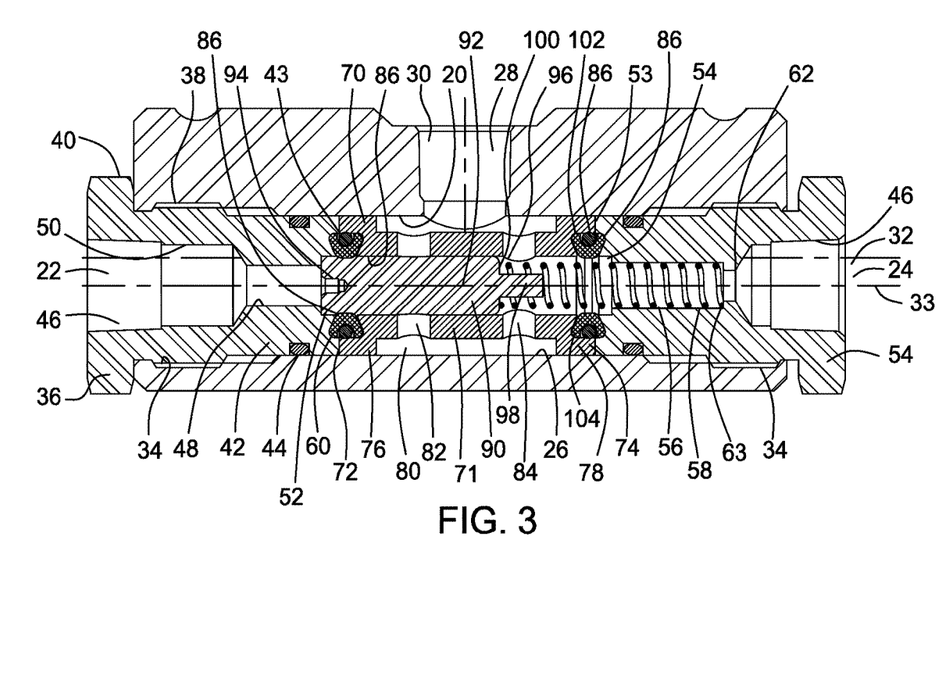
FIG. 3 is a sectional view of the shuttle valve of FIG. 1, at section 3-3 of FIG. 2, showing the shuttle thereof in a position closing the first inlet thereof while leaving the second inlet thereof open.

Referring to FIGS. 1 to 3, a shuttle valve 10 is provided with a body 20 having a first inlet 22 on a first side thereof, a second inlet 24 on a second, opposed, side thereof, and a through bore 26 extending directly between the first and second inlets 22, 24. An outlet 28 is configured with a bore 30 extending through the side wall of the body 20 generally perpendicular to the direction of the through bore 26. The body 20 is generally configured as a right circular cylinder, whereby the centerline 32 of the cylinder is offset from, and generally parallel to, the centerline 33 of the through bore 26.

Each of inlets 22, 24 includes a threaded bore 34 having a first diameter, and terminating at the through bore 26, which has a second diameter smaller than that of the threaded bores 34. An inlet adaptor is threaded into the threaded bores 34 of each inlet 22, 24. The first inlet adaptor 36 is received in the first inlet 22 and includes a threaded outer wall 38 bounded by a head 40 having a larger circumference than that of the threaded outer wall 38 at one end thereof, and a reduced diameter extending plug 42 portion configured to extend inwardly of the through bore 26. Plug 42 includes a seal groove 44 extending inwardly of the outer surface of the plug 42, and having a sealing element such as an O-ring, or an O-ring and backup rings, disposed therein and sealing the seal groove to the surface of the through bore 26. The inlet adaptor 36 includes a multi-part bore extending therethrough, entering through the head 40 and exiting through the plug 42 portion. The bore includes a threaded bore 46 extending through the head 40 and into the body of the adaptor plug 36, a reduced diameter bore 48 extending inwardly of the plug 42 portion, and an intermediate diameter bore 50 connecting threaded bore 46 and reduced diameter bore 48. Additionally, adaptor plug 36 includes a counterbore 52 extending inwardly of the plug 42 portion surrounding the opening of the reduced diameter bore 48 therefrom, wherein the counterbore 52 and the reduced diameter bore 48 are formed about the centerline 33 of the through bore 26. The innermost end face of the inlet adaptor 36 protruding inwardly of the body 20 forms a first engagement surface 43.

A second inlet adaptor 54 is received in the threaded bore 34 of the second inlet 24. The outer circumferential portions, including the seal structure, of the second inlet adaptor are the same as those of the first inlet adaptor. However, the bore extending therethrough from the outer surface of the head 40 to the engagement surface 53 of the second inlet adaptor 54 inwardly of the body 20 are different. Thus, second inlet adaptor 54 includes the threaded bore 46 extending therein through the head 40 and into the body of the second inlet adaptor 54, and a spring bore 56 configured to receive a coil spring 58 therein extending inwardly of the body of the second inlet adaptor 54 from the inner end 60 thereof opposed to the head 40 forming the engagement surface 53, and a communication bore 62, having a smaller diameter than that of the spring bore 56 and the threaded bore 46 communicating therebetween. The communication bore 62, inlet bore 46 and spring bore 56 are also configured about through bore centerline 33. Where the communication bore enters the spring bore 56, a spring ledge 63 extends annularly about the communication bore 62, against which a first end 64 of the spring 58 bears. A counterbore 52 of the same configuration as that in the first inlet adaptor 36 extends inwardly of the engagement surface 53 and surrounds the spring bore 56. Inlet adaptors need not be limited as described above, but may be configured as any of an NPT, SAE or BSPP construction for the engagement thereof with the body 20 as well as the connection thereof with a mating tubular such as piping extending therefrom to the pressurized fluid source. Additionally, outlet 28 is shown integrally configured within the body 20 as a threaded outlet to receive a threaded connection therewith, but may likewise be configured as any of an NPT, SAE or BSPP construction, and may have the same or different configuration as that of the inlets 22, 24.

Between the first and second inlet adaptors 36, 54, and within the through bore 26, are located a cage 70 and a shuttle 90. The cage 70 includes a sleeve shaped main body 71 bounded by opposed end faces 72, 74, which engage against the engagement surfaces 43, 53, respectively, to secure the position of the cage 70 within the through bore 26 against axial movement with respect thereto. The cage 70 further includes opposed flanges 76, 78, which are sized to be slidingly received within through bore 26 with minimal clearance, on the order of 1 to 2 mm, therebetween, and an outer circumferential recess 80 extending inwardly thereof in a radial direction, and which is bounded by the opposed flanges 76, 78. Additionally a plurality of first passages 82 extend through the main body 71 at a first location inwardly of, and all generally equally spaced from, the flange 76, and a plurality of second passages 84 extend through the main body 71 at a second location inwardly of, and all generally equally spaced from, the flange 78. A shuttle bore 86 extends through the main body 71 and is aligned with, and communicates with, the counterbore 52 in the first inlet adaptor and the counterbore 52 in the second inlet adaptor 54. The faces 72, 74 include, at the outer circumferences thereof, a notch or facet 86 configured to form a portion of a seal bore 102 having a seal 104 therein as will be further described herein. Once the valve 10 is assembled, the opposed first and second inlet adaptors 36, 54 secure the cage 70 against axial movement in the through bore 26.

Shuttle 90 is configured for sliding receipt within shuttle bore 86 of cage 80, and includes a generally cylindrical body having an outer circumferential surface 92, a first end 94, and a second end 96 which is configured to engage the spring 58. The second end 96 includes a boss 98 extending therefrom from the base of an annular ledge 100, against which one end of the spring 58 bears. The diameter of the boss 98 is smaller than the inner diameter of the spring bore 56 in the second inlet adaptor, and thus, the boss 98 may be selectively received in the spring bore 56 while providing clearance for the spring 58 therebetween.

In FIG. 3, the shuttle 90 is positioned to seal off the first inlet 22 from the outlet 28, and allow fluid communication through the second inlet 24, through the plurality of second passages 84 and into a manifold formed by the recess 80 and the through bore 26, and thence to the outlet 28. When no fluid pressure is being supplied by a pressure source, such as an accumulator, i.e., when the shuttle valve 10 is in the rest state, the spring bias of the spring 58 maintains the shuttle 90 such that the first end 94 thereof is received within counterbore 52 of the first adaptor 36. A seal groove formed by the notch in the face 72 and the adjacent surface of the engagement surface 43 holds a seal ring, which bears against the outer circumferential surface 92 of the shuttle 90 to seal off communication between the first inlet 22 and the outlet 26.

Figure 4:
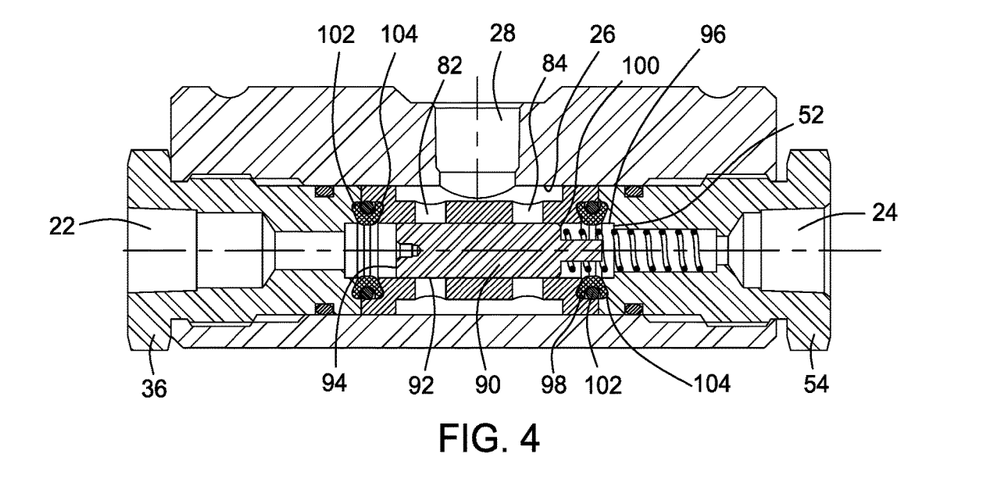
FIG. 4 is a sectional view of the shuttle valve of FIG. 1, at section 3-3 of FIG. 2, showing the shuttle thereof in a position moving away from the first inlet toward the second inlet, wherein the first inlet is no longer fully sealed from the outlet.

During operation of the shuttle valve 10 to close a blowout preventer, fluid under pressure can be supplied to either of, or both of, the inlets 22, 24. If fluid is supplied only to the second inlet 24, the shuttle 90 will remain in the position of FIG. 3, and the fluid will flow from the second inlet 24 to the outlet 26. Likewise, if pressurized fluid of the same pressure is supplied to both the first and the second inlets 22, 24, the shuttle will remain in the position shown in FIG. 3, because the pressure acting on the second inlet 24 side of the shuttle 90 and the force of the spring 58 will provide a greater force on the shuttle acting in the direction of first inlet 22, than the force caused by the pressure on the first end 94 of the shuttle 90 tending to push the shuttle 90 toward the second inlet 24. However, if both of the inlets 22, 24 are intended to be pressurized, and the fluid supplied to the second inlet 24 is less than that supplied to the first inlet 22 and the difference is sufficiently great to overcome the bias of the spring 58, the shuttle 90 can begin to move against the spring 58 and in the direction of the second inlet 24 as shown in FIG. 4. Here, the difference in pressure on the first inlet 22 side as opposed to the second inlet 24 side of the shuttle 90, acting on the opposed effective areas of the shuttle 90, is sufficient to begin compressing the spring 58.

As the shuttle 90 continues to move in the direction of the second inlet 24, as shown in FIG. 4, the annular ledge 100 at the second end 96 of the shuttle 90 has crossed the second plurality of passages 84, and the first end 94 of the shuttle 90 has cleared the seal 104 at the interface of the cage 70 and the first inlet adaptor 36. At this location, as the shuttle 90 is moving in the direction of the second inlet 24, the fluid in the spring bore 56 will have limited pathways to escape, and a buffering or dampening effect will begin to slow the speed of the shuttle 90 in the direction of second inlet 24 as the pressure on the second side 96 of the shuttle will increase because only a narrow annular annulus between the outer surface 92 of the shuttle 90 and the shuttle bore 86 allows the fluid in the spring bore 56 to pass through the second plurality of openings 84.

Figure 5:
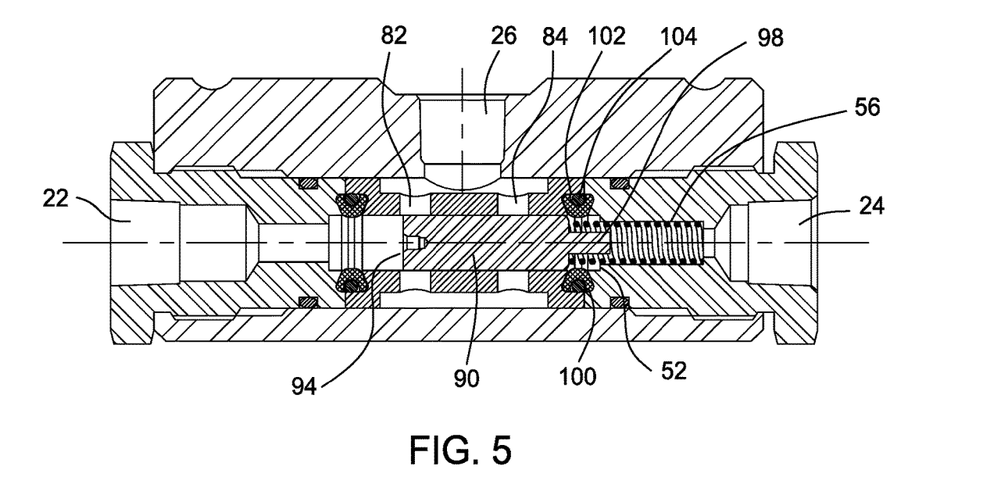
FIG. 5 is a sectional view of the shuttle valve of FIG. 1, at section 3-3 of FIG. 2, showing the shuttle thereof in a position moving away from the first inlet toward the second inlet, wherein the shuttle is about to engage a shuttle seal adjacent to the second inlet and the first inlet is directly exposed to the outlet through passages partially exposed by the shuttle.

As the shuttle continues to move under the influence of the higher pressure in first inlet 22 than in second inlet 24, the ledge 100 of the shuttle 90 will reach the seal 104 at the interface of the cage 70 and the second inlet adaptor 54 as shown in FIG. 5. When the ledge 100 of the shuttle 90 reaches the seal 104 in the seal groove 102 formed at the interface of the cage 70 and the second inlet adaptor 54, sliding sealing engagement between the outer surface 92 of the shuttle 90 and the seal 104 blocks flow from the spring bore 56 to the second plurality of outlets. At this point, the relatively incompressible fluid used to operate the blowout preventer or other equipment is confined to a fixed volume of the second inlet 24, the pressure source piped thereto if activated, and the piping or lines between the pressure source and the second inlet 24. Thus, a high resistance to further motion of the shuttle 90 in the direction of the second inlet adaptor 24 is presented, and the velocity of the shuttle moving through the shuttle bore 86 in the direction of second inlet 24 is reduced. Additionally, just before the ledge 100 of the shuttle 90 reaches the seal 104, the first end 94 of the shuttle 90 passes the circumference of the first passages 82, and fluid begins to flow through the first passages 82 between the first inlet 22 and the outlet 26.

Figure 6:
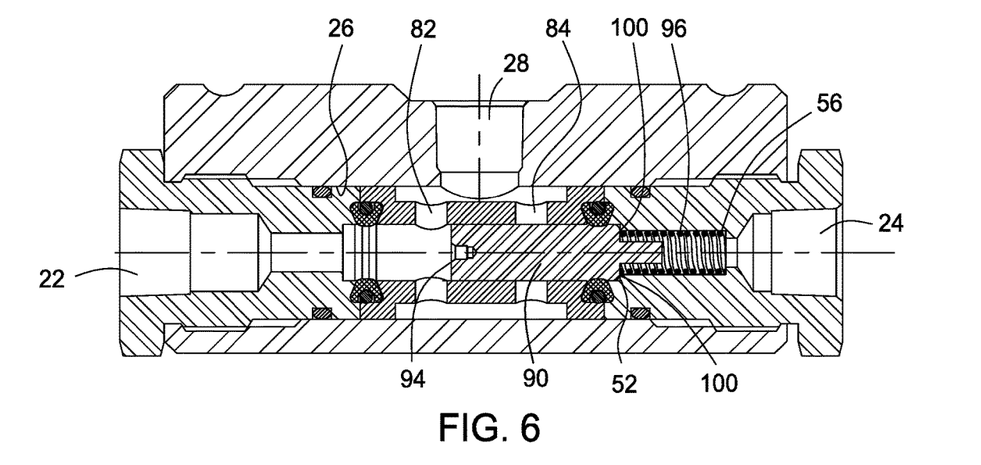
FIG. 6 is a sectional view of the shuttle valve of FIG. 1, at section 3-3 of FIG. 2, showing the shuttle thereof in a position fully moved away from the first inlet and sealing the second inlet.

As the pressure at the first inlet 22 continues to bear against the first side 94 of the shuttle 90, the shuttle 90 continues to move in the direction of the second inlet 24 until the boss 98 of the shuttle 90 extends inwardly of the counterbore 52 of the second inlet adaptor 54 and the ledge 100 engages against the ledge formed between the inner surface of the counterbore 52 and the circumferential surface of the spring bore 56 as shown in FIG. 6. Additionally, in this position, the first end 94 of the shuttle is located between the first plurality of openings 82 and the second plurality of openings, and thus fluid can flow through the first inlet 22, through the first plurality of openings 82 unrestricted by the shuttle 90, and thence out the outlet 24.

Once a test is over, or in the event of an actual well closing event, after the blowout preventer is closed to seal the well bore and locked into position so that fluid pressure is not needed to maintain the rams in the closed position, the pressure at the first and second inlets 22, 24 is vented, i.e., relieved. Thus, the pressure on the first and second sides 94, 96 of the shuttle 90 equalizes. When this occurs, the spring 58 will move the shuttle 90 back into the position shown in FIG. 3, thereby sealing off the first inlet 22 from communication with the outlet 28.

Figure 7:
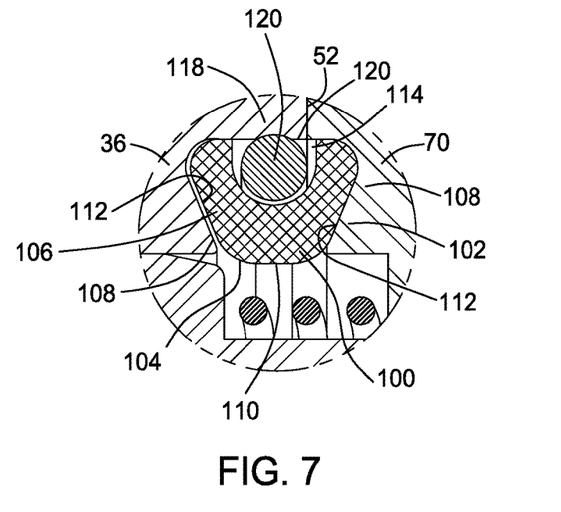
FIG. 7 is an enlarged view of an embodiment of the shuttle seal.

FIG. 7 illustrates an enlarged view of the groove 102 and seal 104 of the shuttle valve 10 In one embodiment, the seal groove 102 is a dovetail shaped groove. As shown, a first portion of the groove 102 is formed in the cage 70 and a second portion of the groove 102 is formed in the engagement face 52 of one of the first inlet adaptor 36 and the second inlet adaptor. In another embodiment, the entire groove 102 is formed in the cage 70 at two locations, between the first plurality of openings 82 and the first inlet adaptor 36, and between the second plurality of openings and the second inlet adaptor 54. The seal 104 engages the outer circumference of the shuttle 90 and seals the cage 70-shuttle 90 interface when the body of the shuttle 90 is extending therethrough. As shown in the cross-section of FIG. 7, the seal 104 is adapted to mate with the groove 102. The seal 104 has a first portion 106 having a V-shaped configuration such that the outer sides of the "V" shape of the dovetail, i.e., the flanks 108 of the seal extending from the apex 110 thereof, engage the inwardly sloping sides 112 of the groove 102 which produces a flexible compressive shape while still interlocking the seal 104 with the groove 102. In one embodiment, the seal 102 may compress a predetermined amount per side when the shuttle 90 engages the seal 104. The first portion 106 of the seal 102 is configured to include a circumferential recess 114 extending inwardly thereof adjacent to the base 118 of the groove 102. In one embodiment, the seal is configured from a polytetrafluoroethylene (PTFE). The V-shaped seal 104, in conjunction with the dovetail shaped groove 102, decreases the likelihood of the seal being extruded during the passage of the shuttle 90 therethrough.

Still referring to FIG. 7, the seal 102 may further include a secondary ring 120 in the circumferential recess, which is sized to tend to radially compress the first portion 106 of the seal 104, and thereby bias the flanks 108 outwardly against the inwardly sloping sides 112 of the seal groove 102. As a result, a firm engagement of the seal within the groove is ensured, thereby further lessening the likelihood of extrusion thereof from the groove 102.

Referring again to FIG. 3, the assembly of the shuttle valve 10 will be described. To assemble the valve 10, the first inlet adaptor 36, having the seal 104 located in the partial portion of groove 102 formed in the engagement face 43 thereof, is secured into the body 20 at the first inlet 22 by rotating the inlet adaptor to connect and tighten to the threaded bore 34 of the inlet 22. Thereafter, the cage 70 and the shuttle 90 slidingly received therein are inserted through the second inlet 24. The seal 104 is also located in the partial groove of groove 102 in the end face of the shuttle 90. The second inlet adaptor 54 with spring 58 in spring bore 56 is then secured in the threaded bore 34 of the second inlet 24, such that the partial groove in the engagement face 53 thereof receives the seal 104 therein, and also abuts the cage 70. As the second inlet adaptor 54 is threaded into the second inlet 24, the cage 70 eventually bears against both of the first and second inlet adaptors 36, 54, and the through passages 82, 84 of the cage 70 will be positioned adjacent to, and in fluid communication with, the outlet 26. At this point, the shuttle valve is ready to be connected to a fluid circuit. To reduce metal to metal friction, galling and corrosion of contacting parts undergoing relative movement, the shuttle and cage may be made from materials such as Notronic 60, PTFE, white Delrin or other subsea compatible material.

Figure 8:
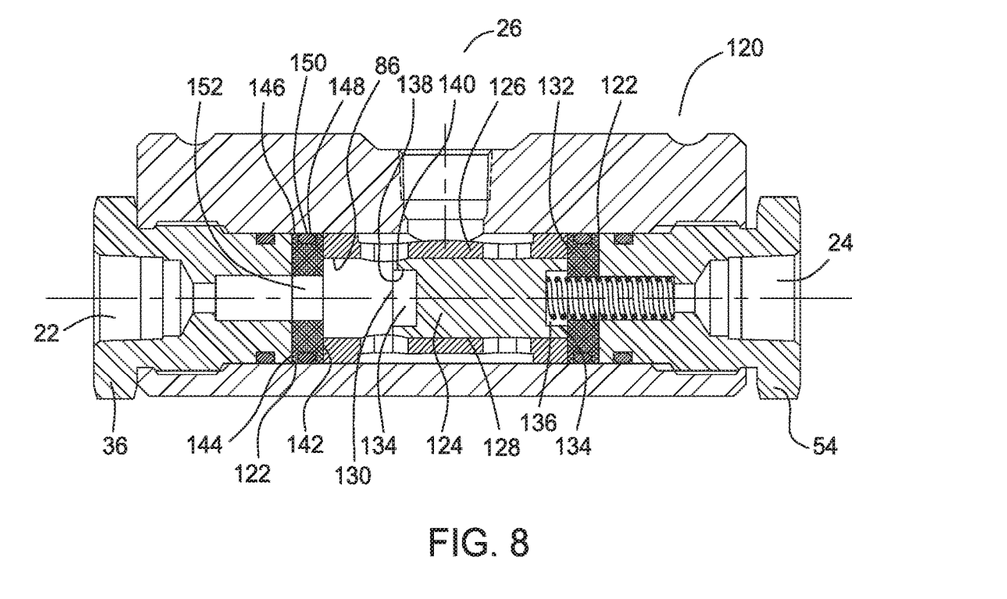
FIG. 8 is a sectional view of a modification of the valve of FIG. 3, at section 3-3 of FIG. 2.

Referring now to FIG. 8, an alternative construct of a shuttle valve 120 is shown, wherein shuttle disks 122 are additionally disposed in the valve bore between the cage 70 and the inlet adaptors 36, 54. In this embodiment of the shuttle valve 120, the shuttle valve body is the same as those of the embodiment of FIGS. 1 to 6, and the constructs of the inlet adaptors 36, 54, cage 126 and shuttle 124 are modified in comparison to that of the embodiment of FIGS. 1 to 6. In particular, in this embodiment, the shuttle seal assembly is modified, so that the seal ring groove holding a seal ring 104 to seal the flow passage around the shuttle to the outlet 26 of the valve 10 is no longer formed by providing portions thereof in the inlet adaptors 36 or 54. Instead, the sealing between either inlet 22 or 24 and the outlet 26 is effectuated by the opposing ends of the shuttle 124 and is caused by the engagement of a shuttle 124 end with a side wall of the shuttle disks 122.

The modified inlet adaptors 36, 54 have the same construct of those of FIGS. 3 to 6, except the facet 86 is not present in the engagement faces 43, 53 thereof. Likewise, the modified cage 126 of the embodiment is different in construct from the cage 70, in that the notch in the end faces thereof to provide the second portion of the seal groove 102 is not present. In other respects, the cage 124 is the same as that of cage 70.

Shuttle 124 of this embodiment includes an outer cylindrical wall 128 configured to be received within, and be slidable with respect to, the shuttle bore 86 of the cage 126, with a clearance therebetween on the order of 1 to 2 mm. Additionally, at least one of opposed end faces 130, 132 of the shuttle 124 includes a shuttle spring bore 134 extending therein. An annular sealing wall is formed of the annular end faces 140 of the shuttle 124 which extend from the bases 136 of the shuttle spring bores 134 and between the inner circumferential wall 138 of the shuttle spring bores 134 and the outer circumferential wall 128 of the shuttle 124.

Annular shuttle disks 122 are disposed in the through bore 26 of the body 20 in locations between the shuttle 124 and the opposed inlet adaptors 36, 54. Each shuttle disk 122 has the same construct, having an inwardly facing sealing face 142 facing the shuttle 124 in the shuttle bore, an outwardly facing face 144 facing the adjacent inlet adaptor 36 or 54, and a circumferential outer surface 146 having a seal groove 148 extending thereinto, with a seal ring such as an O-ring received therein. The seal ring 140 seals the circumferential outer surface 146 of the shuttle disk 122 with the through bore 26 of the body 20. A flow bore 152 extends through the shuttle disk 122 from the sealing face 124 to the outwardly facing face 144. The flow passage is sized to have the same, of approximately the same, circumference as the spring bore in the second inlet adaptor 54.

Figure 9:
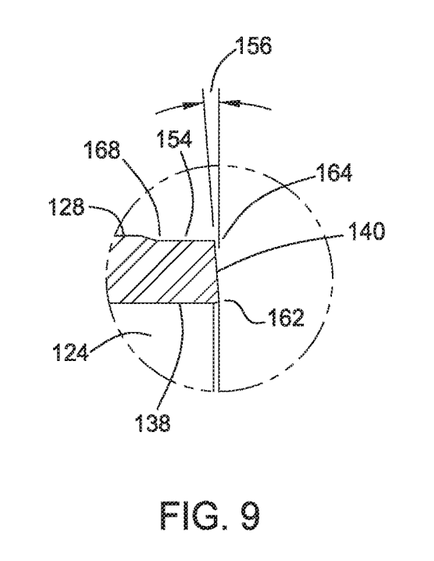
FIG. 9 is an enlarged view of a portion of FIG. 8.
Figure 10:
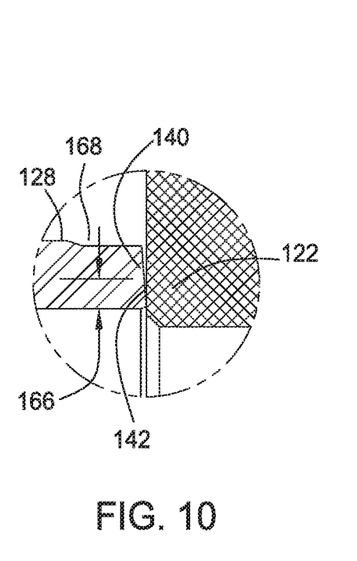
FIG. 10 is an enlarged view of a portion of FIG. 8.

Referring now to FIGS. 9 and 10, an enlarged view of the annular end face 140 of the shuttle 124, and the engagement thereof with the sealing face 124 of the shuttle disk 122 (FIG. 10), is shown. End face 140 is not formed perpendicular to the outer surface 128 and the inner circumferential wall 138 of the shuttle 124. Instead, annular end wall 140 is formed at a small angle 156 difference from perpendicular, on the order of 5 degrees or less, to the outer surface 128 and the inner circumferential wall 138 of the shuttle 124. Thus, an inner edge 162 of the annular end face at the intersection of the annular end face 140 and the inner circumferential wall 138 forms an acute angle, and an outer edge 164 formed at the intersection of the annular end face 140 and the outer surface 128 forms an obtuse angle.

As shown in FIG. 10, as the shuttle 124 engages against the shuttle disk 122, the inner edge 162 initially engages the shuttle disk inwardly facing sealing face 142. The shuttle disk 122 and the shuttle 124 are preferably configured from materials having different elastic properties, i.e., one is stiffer or less likely to deform than the other. For example, the shuttle disks 122 may be configured of Delrin, and the shuttle 124 of stainless steel. As a result, when the shuttle 124 engages against the shuttle disk 122, the annular area of contact is defined by the length of a contact region 166 of the annular end face 140 and the shuttle disk 122. Because the surface of the end face 140 of the shuttle 122 is angled relative to the shuttle disk 122 sealing face 124, the annular end face 140 will initially engage the sealing face 142 at the inner edge 162 thereof, and based upon the pressure on the opposed end 130 of the shuttle 124, will compress inwardly of the sealing face 142 along an annular sealing surface defined by the length of contact region 166 of the annular end face 140 and the shuttle disk 122 sealing face 142. The greater the difference in pressure between the opposed sides of the shuttle 124, the greater the area of the contact region 166. Thus, a self-loading sealing surface is provided to seal the shuttle ends 130, 134 with one of the shuttle disks 140, and the force of the difference in pressure on the opposed sides of the shuttle 124 is multiplied to increase the force of the shuttle annular end face 140 against the sealing face 142 of the shuttle disk 122. For example, the force at the contact region may be 2 to 2.5 times that otherwise determined by the difference in pressure times the cross sectional area of the shuttle 124. Thus, with the shuttle positioned as shown in FIG. 8, fluid is sealed off between second inlet 24 and outlet 26, and fluid may freely flow between the inlet 22 and the outlet 26.

In an alternative construct, the outer surface 128 of the shuttle is modified adjacent the opposed ends 130, 134, by forming an inwardly extending annular recess 168 into the outer surface 128 extending from the ends 130, 134 and inwardly along a short portion of the outer surface 128. This further reduces the shuttle annular end face 140 area, and thus increases the force multiplying effect at the shuttle annular end face 140 against the sealing face 142 interface.

Referring again to FIG. 8, the shuttle valve 120 is shown as including a spring bias on the shuttle 124, formed by spring 58 extending from the ledge in the spring bore 58 of the second inlet adaptor, through the flow bore 152 of the adjacent shuttle disk 120, and into the adjacent spring recess 134 of the shuttle 122. In FIG. 8, the valve 120 is shown in a pressurized condition, wherein the pressure at the first inlet 22 creates a force on the shuttle 124 first end 130 sufficient to overcome the force created by the pressure at the second inlet 24 against the second end 132 and the force of the spring 58 tending to bias the shuttle 124 in the direction of the second inlet 24.

Figure 11:
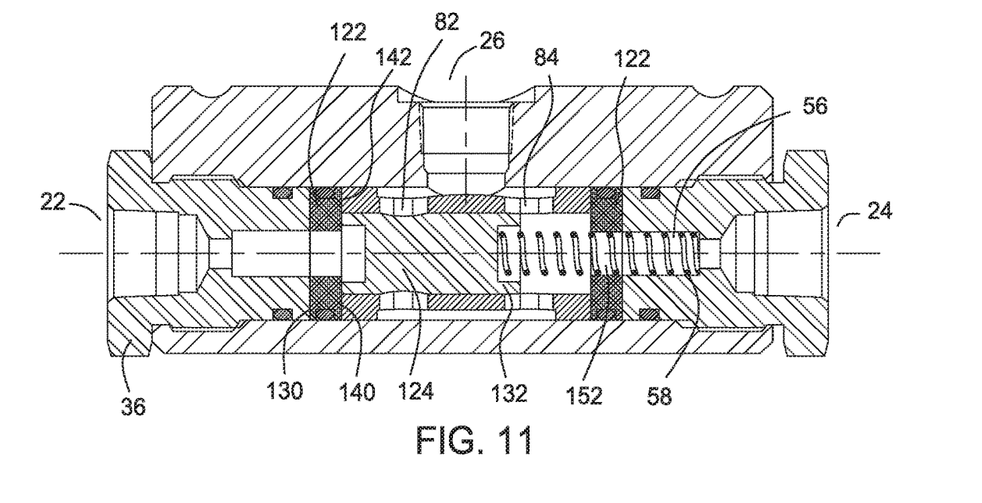
FIG. 11 is a sectional view of a modification of the valve of FIG. 3, at section 3-3 of FIG. 2, showing the shuttle thereof moved with respect to the position thereof in FIG. 8.

Once the valve 120 has been operated to pressurize a downstream device (not shown), and that pressure is no longer required at the downstream device, the pressure in the opposed inlets 22, 24 is vented, such that equal pressures or nearly equal pressure exists in both inlets 22, 24. When this occurs, the shuttle 124 will move from the position of FIG. 8, to the position thereof in FIG. 11. In this position, the spring 58 is fully extended, and the annular outer face 140 of the first end 130 of the shuttle 124 engages against the sealing face 142 of the shuttle disk 122 adjacent to the first inlet adaptor 36. This is the rest, or non-pressurized position of the valve 120. Additionally, it is the position of the shuttle 124 when the valve is pressurized, and the pressure on the second inlet 24 is the same or exceeds that applied to the first inlet 22. In this position, first inlet 22 is sealed off from outlet 26, and fluid from second inlet 24 can flow through the spring bore 56, the flow bore 152 in the shuttle disk 122, inwardly of the shuttle bore 86 and thence through the second plurality of passages 84 to the outlet 26. Additionally, the end 132 of the shuttle 124 extends over a portion of the flow passages of the second plurality of flow passages, which defines the maximum flow rate of fluid from the second inlet 24 to the outlet 26. The greater the overlap between the end 132 of the shuttle 124 and the second flow passages 84, the greater the restriction on the flow from the second inlet 24 to outlet 26 (and also first inlet 22 to outlet 26 (FIG. 8) which the shuttle moves to close off communication between second inlet 24 and outlet 26).

Figure 12:
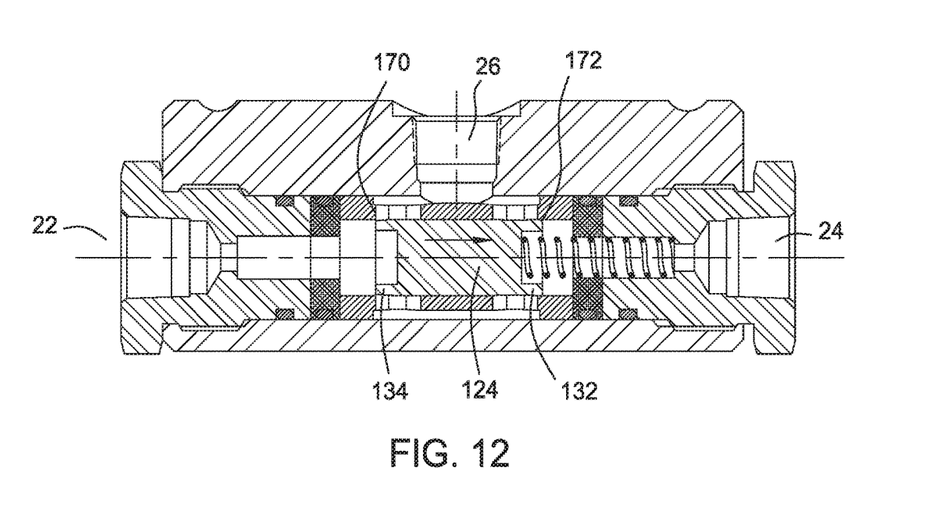
FIG. 12 is a sectional view of a modification of the valve of FIG. 3, at section 3-3 of FIG. 2, showing the shuttle thereof moved with respect to the position thereof in FIGS. 8 and 10.

FIG. 12 depicts the location of the shuttle 124 when the shuttle 124 is moving between the opposed inlet adaptors 36, 54, for example from the position thereof in FIG. 9 to the position thereof in FIG. 8. If the shuttle valve is at rest and then pressurized, where the pressure at the second inlet 24 exceeds the pressure at the first inlet 22, the shuttle 124 will remain in the position thereof in FIG. 11. However, in the pressure at the first inlet 22 is greater than that at the second inlet 24, and sufficient to overcome the bias of the spring 58, the shuttle begins moving in the direction of the second inlet adaptor 54 as shown by the arrow in FIG. 12. In the position of the shuttle 124 shown in FIG. 12, the opposed ends 130, 132 of the shuttle 124 extend over both the first plurality of flow passages (end 130) and the second plurality of flow passages (end 132). However, in this position, clearance between the outer surface 128 and the shuttle bore 86 allows restricted fluid communication between the inlets 22, 24 and the outlet 26 by the restricted annular orifices 170, 172 formed between the outer surface 128 and the shuttle bore 86. Additionally, as the shuttle 124 moves between the locations thereof in FIG. 10 to that shown in FIG. 12, annular orifice 170 is present, but annular orifice 172 does not form until the shuttle 124 extends fully across the second plurality of passages 84. Thus, the movement of the shuttle 124 in the direction of the second inlet 24 is relatively unrestricted by fluid on the second inlet 22 side thereof, because it can readily flow through the second plurality of passages 84. The unrestricted portion of the second plurality of passages 84 will decrease as the shuttle 124 moves in the direction of the second inlet, tending to reduce the ability of fluid on the second inlet side 22 to escape through the second plurality of passages 84, which creates an increasing back pressure on the second end 132 of the shuttle 124, tending to slow (dampen) its velocity in the direction of the second inlet. Then, once the shuttle 124 has crossed over the second plurality of passages 84, the only flow path for fluid in the second inlet 24 is either reverse flow out of the second inlet 24, which is restricted, or through the annular flow passage 172. This flow path is significantly less than that of the plurality of passages 82,84, and thus the back pressure is further increased on the second end 132 of the shuttle 124 and the shuttle 124 velocity in the direction of the second inlet 24 is further reduced.

As the shuttle 124 further moves in the direction of the second inlet 24, the first plurality of passage 82 will begin to be exposed to the fluid at the first inlet, and then an increased flow volume of pressurized fluid can begin to flow therethrough, while the slowed shuttle 124 continues to move in the direction of the second inlet 24. The size of the annular orifice 172 remains the same as the shuttle 124 moves from the position thereof in FIG. 9 to the position thereof in FIG. 8, providing a relatively constant back pressure, and opposing force, on the shuttle 124. Once the shuttle 124 engages the shuttle disk 120 adjacent to the second inlet adaptor, the annular face 140 engages the surface of the shuttle disk, to seal the second inlet fully from the outlet. In an alternative construct, the shuttle 124 may be provided with the annular recess 168 of FIGS. 9 and 10. When the shuttle 124 is so configured, the annular flow passage will have a first area defined by the annular space between the base of the annular recess 168 and the shuttle bore 86, and a second annular area defined by the annular space between the non-recessed portion of the outer surface 128 and the shuttle bore 86. In the position of the shuttle shown in FIG. 12, the first annular area, larger than that of the second annular area, is directly below the passages of the second plurality of passages 84. As the shuttle continues to move in the direction of the second inlet 24, the second annular area, smaller than that of the first annular area, is directly under the passages of the second plurality of passages 84, and thus the flow area available for the escape of fluid from the second inlet side of the shuttle 90 is reduced as compared to when the first area is directly under passages of the second plurality of passages 84. Thus, this alternate construct provides an additional back pressure dampening level as the shuttle 124 moves in the direction of the second inlet.

Although the shuttle valve 120 is shown as including the spring 58, the spring may be omitted. In this case, the only differences in operation of the valve as compared to the spring loaded valve, is that spring bias does not preferentially determine which inlet will be open, and which will be closed, when the valve is pressurized, and the valve will not, in the non-pressurized condition, always have the shuttle 124 disposed to close off the same inlet.

Figure 13:
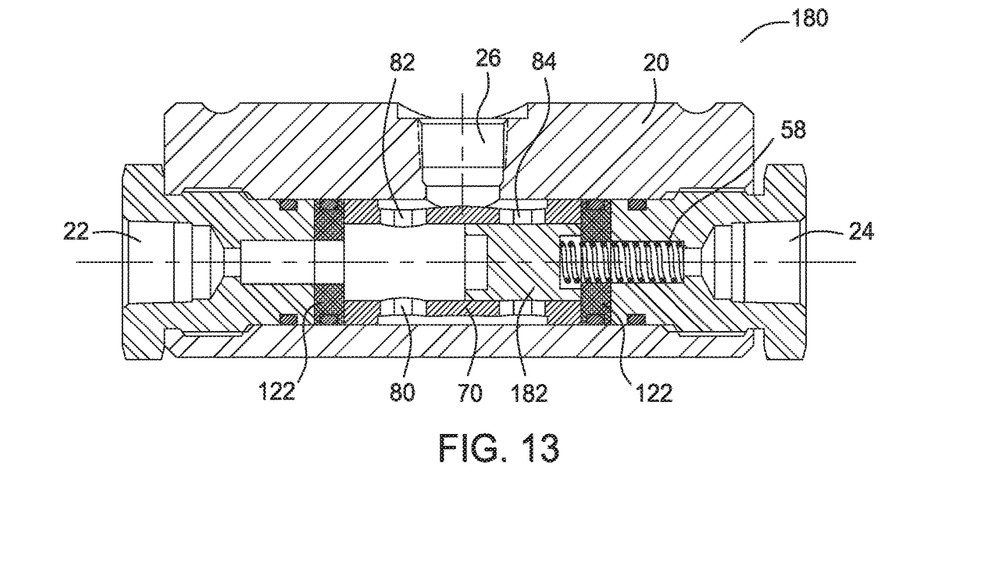
FIG. 13 is a sectional view of a further modification of the valve of FIG. 3, at section 3-3 of FIG. 2.
Figure 14:
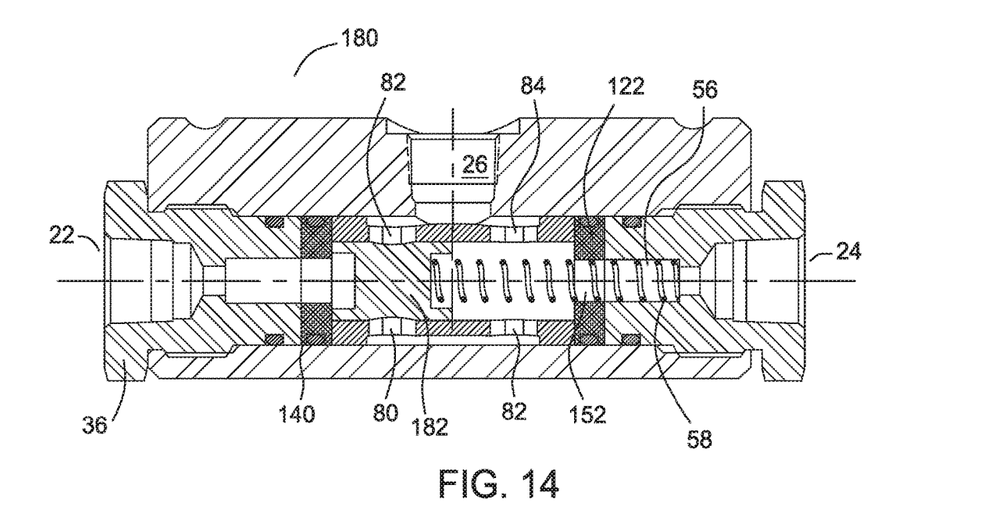
FIG. 14 is a sectional view of the further modification of the valve of FIG. 3, at section 3-3 of FIG. 2, showing the shuttle thereof moved with respect to the position thereof in FIG. 13.
Figure 15:
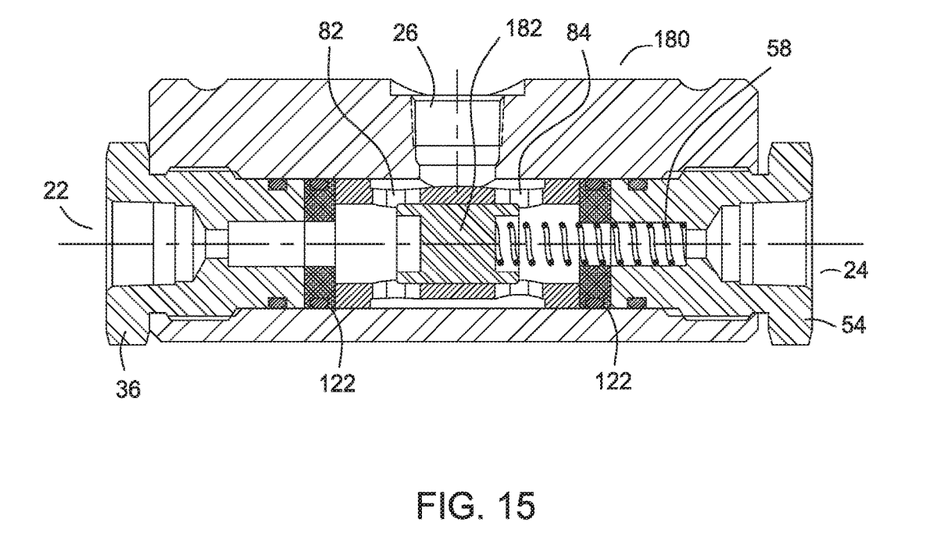
FIG. 15 is a sectional view of the further modification of the valve of FIG. 3, at section 3-3 of FIG. 2, showing the shuttle thereof moved with respect to the position thereof in FIGS. 13 and 14.

Referring now to FIGS. 13 to 15, a further modification of the shuttle valve 120 is shown. In this embodiment, valve 180 includes the same body 20, inlet adaptors 36, 54, shuttle disks 122 and cage 70 as that of valve 118, but the length of the shuttle between the opposed end faces 130, 132 is reduced. In all other respects the modified shuttle 182 is the same. Alternatively, the length of the cage 70 and the spring 58 may be increased, and the shuttle 124 remains unchanged.

FIG. 13 shows the valve in the condition where the second inlet 24 is blocked from communication with the outlet 26 by the shuttle 182, FIG. 14 shows the valve 180 where the first inlet 22 is blocked from the outlet 26 by the shuttle 182, and FIG. 15 shows the shuttle 182 in the intermediate position, where neither inlet 22, 24 is blocked off from communication with the outlet. Thus the shuttle 182 operates similarly to that shown in FIGS. 3 to 6, except that the shuttle does not block the openings in one of the plurality of openings 82, 84 until it begins to not block the openings in the other of the plurality of openings 82, 84.

Referring to FIG. 15, the shuttle 184 is shown in an intermediate position wherein the shuttle is centered with respect to the two sets of openings of the plurality of first and second passages 82, 84 and the plurality of first and second passages 82, 84 are only partially blocked by the shuttle 182. As the shuttle 182 continues to move in the direction of the second inlet 24, the shuttle 182 will cover the second plurality of passages 84, and fully expose the first plurality of openings 80. At this point, the annular orifice 172 is created between the outer wall 128 of the shuttle 184 and the shuttle bore 86, and this orifice will restrict fluid flow from the second inlet side of the opening to the outlet, thereby dampening the movement of the shuttle 182 in the direction of the second inlet. As with the shuttle 124, the annular recess 168 of FIGS. 8 and 9 may be employed, resulting in a two-step dampening as the shuttle 182 moves past the second plurality of openings 84. Likewise, once the annular end face 140 of the shuttle reaches the shuttle disk 122 adjacent to the second inlet adaptor 54, the contact between the shuttle 182 and the shuttle disk 122 seals off communication between the second inlet 24 and the outlet 26, while full communication between the first inlet 22 and the outlet 26 occurs. Additionally, because the openings in both pluralities of openings may be open to fluid flow therethrough simultaneously, a reduction in the force imposed by the fluid against the shuttle occurs earlier, because fluid is diverted to the outlet after shorter shuttle 182 movement as compared to that of shuttle 124.

As with the valve 120, shuttle valve 180 may be configured with a spring 58 to bias the shuttle 182 toward an inlet side to seal that inlet side when the shuttle is not pressurized, or the spring may be omitted, with the same effect as the omitted spring with respect to the shuttle valve 120.

Figure 16:
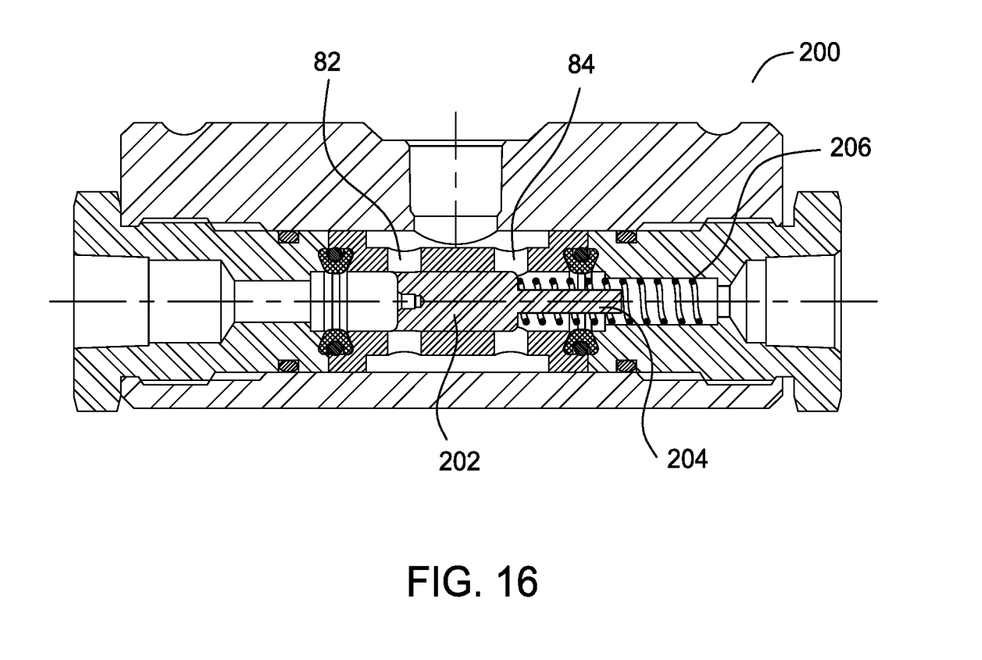
FIG. 16 is a modified version of the shuttle valve of FIG. 3.

Referring now to FIG. 16, another construct of a shuttle valve is shown. In the construct, the shuttle valve 200 is the same as shuttle valve 10 of FIG. 3, except the length of the shuttle 202 is shortened such that when the shuttle 202 is in the intermediate position between both inlets 22, 24 as shown in FIG. 16, both pluralities of the plurality of first and second passages 82, 84 are at least partially unblocked. Additionally, the boss 204 and spring 206 of the valve 200 are changed as compared to boss 98 and spring 58 of the valve 10 of FIG. 3. Specifically, the boss 204 and spring 206 are increased in length as compared to boss 98 and spring 58 of the valve 10 of FIG. 3. Because the shuttle 202 does not simultaneously cover both of the plurality of flow passages 82, 84 when in the intermediate position, the flow paradigm of the shuttle valve 200 operates similarly to that of valve 180 of FIGS. 12 to 15. In all other respects, shuttle valve 200 is identical to that of shuttle valve 10 of FIG. 3. Although shuttle valve 200 is shown having a spring loading, the spring 204 and boss 202 may be removed, and the shuttle 202 will move solely based on the pressure on the opposed sides thereof, and there will be no preferred rest position thereof.

The shuttle valves described herein have a minimum of parts, and effectively control the flow of fluid thereto to control the operation of downstream hydraulically operated components. The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A shuttle valve, comprising:
   a body having a through bore extending therein configured to provide a first inlet and a second inlet;
   an outlet intersecting the through bore;
   a cage disposed in the through bore;
   a shuttle moveably disposed in the cage; and
   at least one shuttle disk, having a stiffness different than the stiffness of the shuttle, disposed between the cage and at least one of the inlets, wherein the shuttle and cage are configured to allow engagement between the shuttle and the shuttle disk to effectuate sealing of the at least one inlet from the outlet;
   wherein the through bore includes an annular spring ledge therein; and
   a spring is disposed between, and in contact with, the annular spring ledge and the shuttle;
   wherein the shuttle further comprises a shuttle annular ledge from which a boss extends, and one end of the spring contacts the shuttle annular ledge;
   the shuttle disk includes an opening extending therethrough; and
   the spring extends through the opening.

2. The valve of claim 1, wherein:
   the shuttle disk includes an annular sealing wall; and
   the shuttle includes an annular end wall engagable against the annular sealing wall to seal the at least one inlet from the outlet.

3. The valve of claim 2, wherein the shuttle further comprises:
an inner circumferential wall terminating at the annular end wall, and an outer surface terminating at the annular end wall; and
the angle between the annular end wall and at least one of the inner circumferential wall and the outer surface is at least 85 degrees and less than 90 degrees.

4. The valve of claim 2, wherein the shuttle further comprises:
an inner circumferential wall terminating at the annular end wall, and an outer surface including an annular recess extending inwardly of the outer wall and terminating at the annular end wall.

5. The valve of claim 1, wherein the cage comprises a shuttle bore, having a longitudinal bore axis, surrounded by a cage wall, and at least one first passage and at least one second passage extending through the cage wall and communicating between the cage bore and the outlet, the first and second passages spaced apart in the longitudinal axis direction; and
the shuttle is slidingly moveable within the cage bore and positionable to simultaneously cover the first and the second passages.

6. The valve of claim 1, wherein the cage comprises a shuttle bore, having a longitudinal bore axis, surrounded by a cage wall, and at least one first passage and at least one second passage extending through the cage wall and communicating between the cage bore and the outlet, the first and second passages spaced apart in the longitudinal axis direction; and
the shuttle is slidingly moveable within the cage bore and positionable to selectively cover the first and the second passages.

7. The valve of claim 6, wherein the length of the shuttle in the longitudinal axis direction of the cage exceeds the distance between the centers of the first and the second passages in the shuttle in the longitudinal axis direction of the cage.

8. The valve of claim 6, wherein the length of the shuttle in the longitudinal axis direction of the cage is less than the distance between the centers of the first and the second passages in the shuttle in the longitudinal axis direction of the cage.

9. The shuttle valve of claim 1, wherein;
the shuttle disk has a shuttle engagement surface disposed in a first plane; and
the end surface of the shuttle engageable with the shuttle disk is angularly offset from the plane of the shuttle engagement surface of the shuttle disk.

10. The valve of claim 1, further comprising a first inlet adaptor extending inwardly of the first inlet and contacting a first shuttle disk;
and a second inlet adaptor extending inwardly of the second inlet and contacting a second shuttle disk; wherein
the cage is secured in the bore between the first and second shuttle disks.

* * * * *